(12) United States Patent
Jenkins, IV (10) Patent No.: US 8,850,377 B1
(45) Date of Patent: Sep. 30, 2014

(54) BACK ANNOTATION OF OUTPUT TIME DELAYS

(71) Applicant: Xilinx, Inc., San Jose, CA (US)

(72) Inventor: Jesse H. Jenkins, IV, Danville, CA (US)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 13/837,072

(22) Filed: Mar. 15, 2013

Related U.S. Application Data (62) Division of application No. 13/010,308, filed on Jan. 20, 2011, now abandoned.

(51) Int. Cl.
*G06F 17/50* (2006.01)

(52) U.S. Cl.
CPC .................................. *G06F 17/5068* (2013.01)
USPC .......................................... 716/116; 716/117

(58) Field of Classification Search
USPC ................. 716/116–118, 121, 110, 111, 113; 326/37–38, 47
See application file for complete search history.

(56) References Cited

U.S. PATENT DOCUMENTS

| | | | |
|---|---|---|---|
| 5,278,769 A * | 1/1994 | Bair et al. .................... | 703/19 |
| 5,475,607 A * | 12/1995 | Apte et al. ................... | 716/113 |
| 6,118,324 A | 9/2000 | Li et al. | |
| 6,133,751 A | 10/2000 | Churcher et al. | |
| 6,184,729 B1 | 2/2001 | Pasqualini | |
| 6,198,308 B1 | 3/2001 | Morrill | |
| 6,239,616 B1 | 5/2001 | Churcher et al. | |
| 6,634,015 B2 | 10/2003 | Lee et al. | |
| 6,897,683 B2 | 5/2005 | Kernahan et al. | |
| 6,922,665 B1 * | 7/2005 | Guccione et al. ............... | 703/14 |
| 6,998,892 B1 | 2/2006 | Nguyen et al. | |
| 7,138,829 B1 | 11/2006 | Dalvi | |
| 7,139,691 B1 | 11/2006 | Duong | |
| 7,191,419 B2 | 3/2007 | Soreff et al. | |
| 7,337,100 B1 * | 2/2008 | Hutton et al. .................. | 703/13 |
| 7,412,673 B1 | 8/2008 | Duong | |
| 7,428,717 B1 | 9/2008 | Duong | |
| 7,454,301 B1 | 11/2008 | Daud et al. | |
| 7,457,589 B2 | 11/2008 | Kuzmenka | |
| 7,509,608 B1 | 3/2009 | Duong | |

(Continued)

OTHER PUBLICATIONS

U.S. Appl. No. 13/010,308, filed Jan. 20, 2011, Jenkins, IV.

(Continued)

*Primary Examiner* — Stacy Whitmore
(74) *Attorney, Agent, or Firm* — Scott Hewett; LeRoy D. Maunu (57) ABSTRACT

A method of configuring an integrated circuit includes developing a circuit simulation model of a circuit having an output port to be configured in the integrated circuit. A number of simultaneously switched outputs (SSOs) are defined according to the circuit simulation model, and a propagation delay at the output port is characterized according to the number of SSOs. The circuit simulation model is back-annotated from the output port to add the propagation delay in a signal path of the output port to produce a second circuit simulation model. A configuration bitstream is generated according to the second circuit simulation model and the integrated circuit is configured according to the bitstream.

17 Claims, 5 Drawing Sheets

(56) References Cited

U.S. PATENT DOCUMENTS

| | | | |
|---|---|---|---|
| 7,589,557 B1 | | 9/2009 | Bergendahl et al. |
| 7,979,834 B1 | | 7/2011 | Duong |
| 8,346,529 B2 | * | 1/2013 | Kakkar et al. .................. 703/15 |
| 2003/0115557 A1 | | 6/2003 | Elzinga |
| 2003/0151426 A1 | | 8/2003 | Islam |
| 2005/0068082 A1 | | 3/2005 | Nguyen et al. |
| 2005/0132087 A1 | | 6/2005 | Glinski et al. |
| 2006/0031797 A1 | | 2/2006 | Soreff et al. |
| 2006/0112358 A1 | * | 5/2006 | Jiang et al. ......................... 716/4 |
| 2006/0117274 A1 | * | 6/2006 | Tseng et al. ....................... 716/1 |
| 2007/0240091 A1 | | 10/2007 | Vujkovic et al. |
| 2008/0061836 A1 | | 3/2008 | Cheng |
| 2008/0218198 A1 | | 9/2008 | Yasuda |
| 2008/0265937 A1 | | 10/2008 | Sima et al. |
| 2009/0040846 A1 | | 2/2009 | Chang |
| 2011/0042820 A1 | | 2/2011 | Knickerbocker |
| 2012/0086050 A1 | | 4/2012 | Bemanian et al. |
| 2012/0239338 A1 | | 9/2012 | Liu et al. |

OTHER PUBLICATIONS

Fairchild Semiconductor, "*Understanding and minimizing Ground Bounce*", Application Note AN-640, Feb. 2003, pp. 1-16, www.fairchildsemi.com.

Heydari, et al., "*Ground Bounce in Digital VLSI Circuits*", IEEE Trans. on VLSI Systems, vol. 11, No. 2, Apr. 2003, pp. 180-193.

Mokhtari et al., "*Automatic Extraction of Higher Order Interconnect Parasitics for Device Level Simulators for VHSIC Applications*", IEEE-CAS Symp., IEEE, Pub. No. 0-7803-3625-9/96, Sep. 1996, pp. 44-49, Pavia, Italy.

Xilinx, Inc., "*Advanced ChipSync Applications*", Application Note XAPP707, Oct. 31, 2006, pp. 19, 20, and 27-31, Xilinx, Inc., 2100 Logic Drive, San Jose, CA 95124 USA.

Xilinx, Inc., "*NGDAnno Overview*", downloaded on Mar. 26, 2010, pp. 1-2, http://www.xilinx.com/itp/xilinx4/data/docs/dev/ngdanno2.html, Xilinx, Inc., 2100 Logic Drive, San Jose, CA 95124 USA.

* cited by examiner

BACK ANNOTATION OF OUTPUT TIME DELAYS

TECHNICAL FIELD

An embodiment of the invention relates generally to techniques for simulating the performance of integrated circuits, and more particularly to techniques for accounting for time delay creep associated with ground bounce.

BACKGROUND

Ground bounce can occur with high-speed digital integrated circuits ("ICs") when multiple outputs change states simultaneously. Ground bounce can cause several undesired effects, both on the output of the switching device and on the receiving logic device. In order to avoid problems associated with ground bounce, manufacturers of ICs publish tables of guidelines for the maximum number of simultaneous switching outputs ("SSOs") that each power/ground pair (driver) of an IC can provide without violating a specified ground bounce limit.

Ground bounce is primarily due to current changes in the combined inductance from ground pins, bond wires, and ground metallization. The internal ground level of the IC deviates from the external system ground level for a short duration (typically a few nanoseconds) after multiple outputs change state simultaneously.

The switching output is supposed to provide a logical "1" or logical "0". Ground bounce can affect whether the switching output is properly read by receiving logic because the logical state is typically derived by comparing an incoming signal to the internal ground of the switching device. Noise on the signal and/or ground can alter the logical state read by the receiving logic and cause erroneous operation of the system if the ground bounce amplitude exceeds the instantaneous noise margin. For example, ground bounce noise on a non-changing input that raises the internal ground level above the instantaneous noise margin might unintentionally toggle the logical state of a receiving logic input. In other words, the ground bounce can be interpreted as a switched signal on an input that isn't being switched.

The ground bounce limit is set according to the most sensitive input driven by the switching device. Given a ground bounce limit, the number of SSOs ("drivers") allowed on a power/ground pair is set according to several assumptions. Manufacturers print tables of SSO guidelines for various types of logic, drivers, and packages. The SSO guidelines assume various values for parameters that affect ground bounce voltage.

Weighted average SSOs ("WASSOs") are often calculated for adjacent I/O banks of a digital switching device to model device operation and account for simultaneous switching events. Ground bounce voltage performance of the adjacent I/O banks is evaluated by comparing the average WASSO for the adjacent I/O banks against the SSO allowance. If the average WASSO exceeds a selected amount, techniques are applied to reduce ground bounce in the digital system.

Time delay creep, also known as propagation delay degradation, is a time-related phenomenon associated with SSO events that can occur in a physical device and cause the physical device to operate in a fashion that is different from the expected operation based on the device simulation. Propagation delay, as measured to the input threshold level of the receiving port or device, becomes longer due to inductive ground bounce voltage on the output of the transmitting port or device (e.g., the NMOS output driver of a CMOS I/O port). The decreased current through the output driver results in more time required to charge the input capacitance of the receiving port. A conventional response to account for propagation delay degradation is to physically measure evaluation devices and compare measured performance against a specified maximum value of time delay.

Techniques for more accurately accounting for propagation delay degradation associated with ground bounce events are useful and desirable.

SUMMARY

A method of configuring an integrated circuit includes developing a circuit simulation model of a circuit having an output port to be configured in the integrated circuit. A number of simultaneously switched outputs (SSOs) are defined according to the circuit simulation model, and a propagation delay at the output port is characterized according to the number of SSOs. The circuit simulation model is back-annotated from the output port to add the propagation delay in a signal path of the output port to produce a second circuit simulation model. A configuration bitstream is generated according to the second circuit simulation model and the integrated circuit is configured according to the bitstream. In a particular embodiment, the integrated circuit is a programmable logic device.

In a particular embodiment, the propagation delay is characterized by measuring the propagation delay of a single switched output and multiplying the propagation delay by the number of simultaneously switched outputs. In an alternative embodiment, the step of characterizing the propagation delay includes measuring a plurality of propagation delays for a corresponding plurality of numbers of SSOs.

In a particular embodiment, back-annotating the circuit simulation model includes adding the propagation delay to a weighted-average SSO timing value of the circuit simulation model.

In a further embodiment, the circuit simulation model includes a package load model connected to the output port. In a particular embodiment, the circuit simulation model includes a printed wiring board load model connected to the output port.

In a particular embodiment, the signal path is a clock signal path.

In another embodiment, a digital system includes a transmitting integrated circuit (IC) having a plurality of data output ports and internal programmable resources, and a receiving IC having at least one data input port with a data input port capacitance. A signal path between a data output port of the transmitting IC and a data input port of the receiving IC has an inductance. The inductance cooperates with the data input port capacitance to create time delay creep at the data output port. A delay path in the transmitting IC is configured to add a selected delay to reduce the time creep. In one embodiment, the delay path is in a clock signal path of the transmitting IC. In another embodiment, the delay path is in a data path of the data output port. In a further embodiment, a second delay path in a clock signal path of the transmitting IC is included with the delay path in the data path.

In a particular embodiment, the transmitting IC is a programmable logic device. In a more particular embodiment, the transmitting IC is an FPGA and the delay path is configured in the FPGA. In a further embodiment, the receiving IC is a second FPGA. In another embodiment, the receiving IC is stacked on the transmitting IC. Alternatively the transmitting IC and the receiving IC are mounted on a package substrate or a silicon interposer.

In a further embodiment, the transmitting IC is configured to simultaneously switch the plurality of data output ports and the selected delay is selected according to a number of simultaneously switched outputs.

In another embodiment, a computer program product for configuring an integrated circuit includes a non-transitory computer readable storage medium having computer readable program code embodied therewith. The computer readable program code includes a circuit simulation model of a circuit having an output port to be configured in the integrated circuit and instructions for defining a number of simultaneously switched outputs (SSOs) according to the circuit simulation model. Additional instructions characterize a propagation delay at the output port according to the number of SSOs, and back-annotate the circuit simulation model from the output port to add the propagation delay in a signal path of the output port to produce a second circuit simulation model. A bitstream is generated according to the second circuit simulation model for configuring the integrated circuit.

DETAILED DESCRIPTION OF THE DRAWINGS

New concepts for accounting for time delay due to SSOs in a digital switching system are presented. Time delay creep is distinguished from ground bounce in that the latter is a voltage level, while time delay creep is a period associated with a signal rising to a desired level to be sensed as a data value. Embodiments incorporate time delay into system simulations as one or more analytic models or as one or more sets of empirically derived tables. Analytic models or tables are developed for an IC chip in various combinations of device packages, as time delay is often affected by interconnect loading. In some embodiments, tables or circuit models are developed for a device operating under various conditions, such as for different bias voltages or temperatures. In further embodiments, a user scales the model or table with additional loading data, which may arise from the packaged device being attached to the user's printed wiring board (PWB), for example. In a particular embodiment, a spread-sheet-type of table allows a user to specify the number of SSOs and their associated output loading arising from the user's PWB, for example.

Adding in the timing element arising from time delay creep permits a more accurate prediction of the actual (physical) device or system operation. In a particular embodiment, these timing elements are added to simulated operating timing collected after place-and-route of a configurable logic device, such as a field-programmable gate array (FPGA) has occurred. The designer can evaluate the proposed physical design of the configured logic device using a system simulator, and obtain a more accurate representation (e.g., logic waveform at an output port of the IC) of device operation. In other words, the logic waveform obtained from the simulation would more closely match the measured waveform of the physical device (e.g., an oscilloscope trace).

In a particular embodiment, time elements associated with time delay creep are table driven and occur in the Integrated Software Environment (ISE) design suite (IDS) design flow at point in the process commonly known as native generic database annotation (NGDAnno). ISE and IDS products are available from Xilinx, Inc., of San Jose, Calif. A netlist is produced that includes back annotated internal delays based on measurements of various paths encountered by connections within the design, as well as the time delays of the silicon logic structures. For example, to insert the output buffer time delay into the netlist, a time element associated with time delay creep (e.g., output loading) is added to the weighted average SSO (WASSO) time element of the device or system simulation model and the simulator is run (or re-run). An exemplary NGDAnno format includes slots to add time delays, such as for routing and component switching delays. In a particular embodiment, time delays accounting for output delay creep are back annotated and added to these slots. In some embodiments, a time delay slot includes a routing or component switching delay, and a time creep delay is added to the switching delay to provide a total delay.

Figure 1:
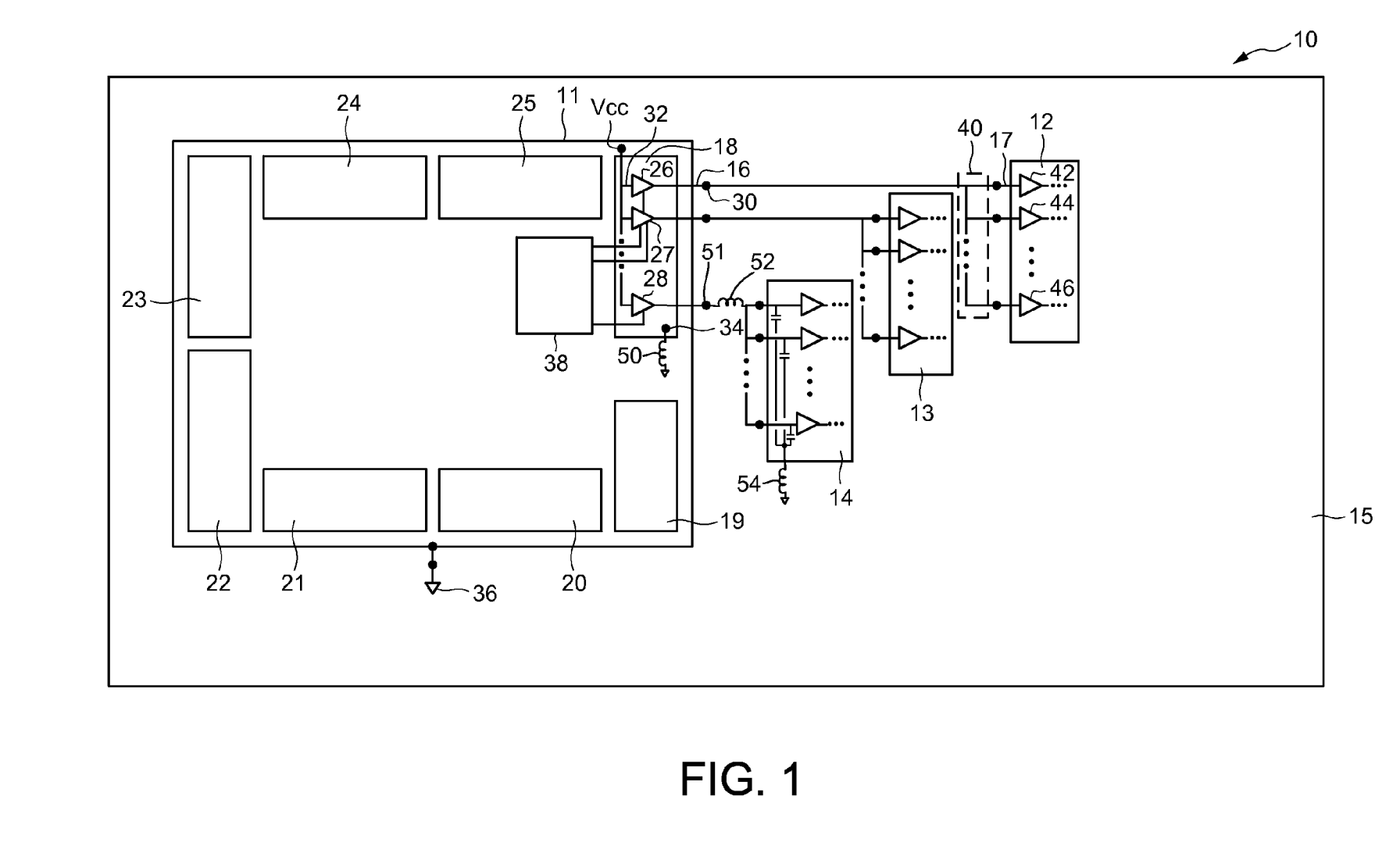
FIG. 1 is a simplified diagram of a digital system simulated according to an embodiment of the present invention.

FIG. 1 is a simplified diagram of an integrated system such as digital system 10 simulated according to an embodiment of the present invention. A transmitting IC such as transmitting logic IC 11 (which may be an FPGA or other semiconductor IC) is coupled to receiving ICs such as receiving logic ICs 12, 13, 14 through a PWB 15. The PWB has vias and traces that create inductance between an output 16 of the transmitting logic IC 11 and inputs 17 of the receiving logic IC 12. In an alternative embodiment, the transmitting logic IC and receiving logic IC are mounted on an interposer, such as a silicon interposer. In another embodiment, the transmitting logic IC and receiving logic IC are mounted on a package substrate. In yet another embodiment, a receiving logic IC is mounted on the transmitting logic IC (e.g., stacked on the front side or the backside of the transmitting IC). Those of skill in the art of digital systems appreciate that in some embodiments, a receiving IC may be subsequently configured in the system to be a transmitting IC, and similarly that the transmitting IC above may be configured to receive data. In a particular embodiment, the transmitting IC is a first FPGA and the receiving IC is a second FPGA.

Power ($V_{CC}$) is supplied to I/O blocks 18, 19, 20, 21, 22, 23, 24, 25, which distribute the power to drivers 26, 27, 28 within the I/O block 18. Only some of the drivers in only one I/O block are shown for simplicity of illustration. In some digital switching devices, such as FPGAs, the drivers 26, 27, 28 are configurable, providing a selectable output voltage ($V_{CCO}$) on the power output pin 30 according to the type of receiving logic IC. The power input 32 to the driver 26 forms a power/ground pair with the ground 34 of the transmitting logic IC 11, which is coupled to the PWB ground 36 through conductive traces and vias (not shown) of the transmitting logic IC 11. Internal resources such as internal logic 38 configures the driver 26 for a selected type of load and controls the state of the driver (i.e., switches the driver between a logical 1 and a logical 0).

The driver 26 supplies a switching signal (i.e., a logical 1 or a logical 0) to a bus (shown in a dashed line) 40 on the PWB 15 that couples the switching signal to loads 42, 44, 46 of the receiving logic IC 12. Thus, the loads of the receiving logic IC switch simultaneously. Alternatively, the bus distributes the switching signal to additional receiving logic ICs.

The driver 28 and receiving logic IC 14 operate in a similar fashion. An inductance, represented by an inductor 50 between the ground 34 of the transmitting logic IC 11 and the driver 28, creates a voltage at the output 51 in response to ground bounce, which in many instances is related to the number of SSOs. For example, where the output driver is an NMOS device, or includes an NMOS device in a CMOS output driver, the voltage established across the inductor 50 raises the drain voltage of the NMOS device and reduces current through the device. The inductance 52 from the PWB traces can similarly reduce the current available to charge the input capacitance, represented by capacitors in the receiving device 14, which are not individually identified with reference numerals for clarity and simplicity of illustration, resulting in time delay creep. Similarly, inductance 54 from the ground path of the receiving device can result in time delay creep. In other words, the logic timing is degraded, which, while related to ground bounce, is a separate effect not accounted for in WASSO calculations and simulations. In some embodiments, the inductor 50 represents the ground inductance of an IC die, and in other embodiments, the inductor 50 represents the ground inductance of a packaged IC die, i.e., it includes the inductance of the package.

One or more time delays associated with propagation delay degradation are added to the circuit or system simulation model, and added to the transmitting logic IC 11, such as by adding additional delay to one or more signal paths in the internal logic 38. While adding delay to a signal path is generally avoided by circuit designers, if data is not present at the logic node at the appropriate time, an error may occur if time delay creep is not accounted for. The transmitting logic IC 11 is configured so that data arrives at a timing point that includes a component for time delay creep (i.e., a selected delay) according to an embodiment. In one embodiment, the clock signal to the logic (e.g., a flip-flop) is selectively delayed to account for time creep. In an alternative embodiment, the I/O signal (data) to the flip-flop is de-skewed to reduce time creep. In another embodiment, both the I/O signal and the clock signal are adjusted to account for time creep.

For example, a table of time delays associated with the device parasitics for different numbers of switching outputs is derived by modeling or measurement of a physical device. In one technique, an oscilloscope is connected to an output port of a configurable switching device, and the output waveform is compared to the clock waveform (commonly called the edge rate) for various numbers of simultaneously switched outputs. The differences in edge rates are then incorporated as time delays into the device simulation model. In one embodiment, the time delays associated with propagation delay degradation are added to the WASSO settling times for the corresponding number of switched outputs for a particular device type or packaged device. A method for calculating WASSO ground bounce noise in a digital system is described in co-owned U.S. Pat. No. 7,139,691 by Anthony T. Duong, Issued Nov. 21, 2006, the disclosure of which is hereby incorporated by reference in its entirety for all purposes.

In a particular embodiment, a netlist generated by NDG-Anno includes back-annotated internal time creep delays based on measurements of various paths encountered by connections within the design, as well as the time delays of silicon logic structures. The time delays associated with particular numbers of SSOs are inserted (added) to the output buffer time delay associated into the netlist of the simulation model. Time creep is relevant for signals that migrate between die in a stacked multi-die IC. In such hybrid ICs, time creep may impact frequency (e.g., the maximum port-to-port transmission rate) between the die, which are often operated as a single chip as far as the user is concerned. In other words, a die (IC chip) used in a stacked chip application might have a reduced maximum frequency specification than when used in a stand-alone application due to time creep, separate from clock skew issues.

A FPGA typically supports 5 or more different types of driver configurations. This allows the user great flexibility in using the FPGA in a digital system. Different types of receiving logic ICs may operate according to different logic standards (i.e., provide different types of loads). Some types of receiving logic ICs and PWBs present a different impedance to the transmitting IC. For example, a receiving logic IC may have a greater input capacitance (i.e., require a longer time to rise to the desired logic voltage level than was assumed in a conventional circuit simulation) than another. Time delay creep in such circumstances could result in erroneous operation of the digital system.

Figure 2:
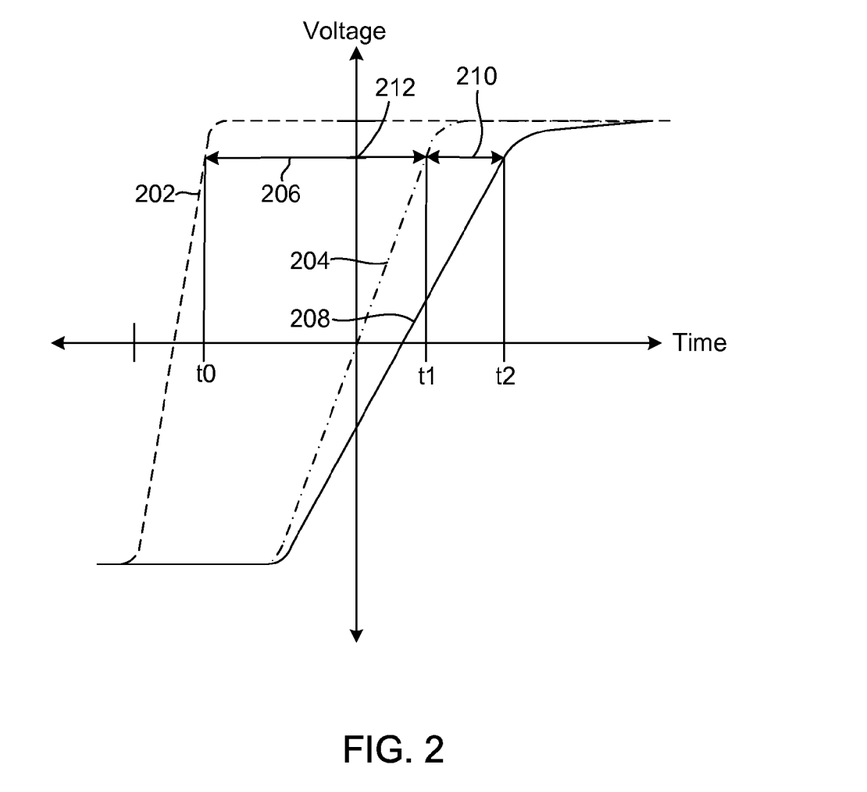
FIG. 2 shows plots of output voltage versus time illustrating time delay as a function of switched outputs.

FIG. 2 shows plots of output voltage versus time illustrating time delay as a function of switched outputs. The plots are representative of the voltages that are expected to be measured with an oscilloscope at a transmitting logic device into a load or loads (i.e., a characterized port(s) of a receiving logic IC). A first plot 202 shows a clock input signal. A second plot 204 shows the voltage output (data out) waveform for a single switched output from the transmitting logic device. The propagation delay time 206 between the clock signal and the data output is typically about a fraction of a pico-second (ps) to a few nano-seconds (ns), and is typically accounted for in standard circuit simulation models. A third plot 208 shows the voltage output (data out) waveform for several, e.g., eight, simultaneously switched outputs. The time delay 210 between when a single switched output achieves a valid data state 212 (i.e., the voltage recognized as a digital value) and then the N-switched output achieves a valid data state is the time delay creep or propagation delay degradation due to multiple SSOs. The time delay creep depends on several factors, such as operating voltage, compliance of the power supply, logic voltage level (e.g., less time delay creep occurs at lower voltage=1 values), receiving port capacitance, and number of outputs switched. In some cases, the time delay creep/switched output is essentially linear, allowing a standard time delay to be multiplied by the number of SSOs. In other cases, time delay creep is not linear with the number of SSOs and the measured or modeled time delay creep as a function of switched outputs is tabulated or summed.

Figure 3:
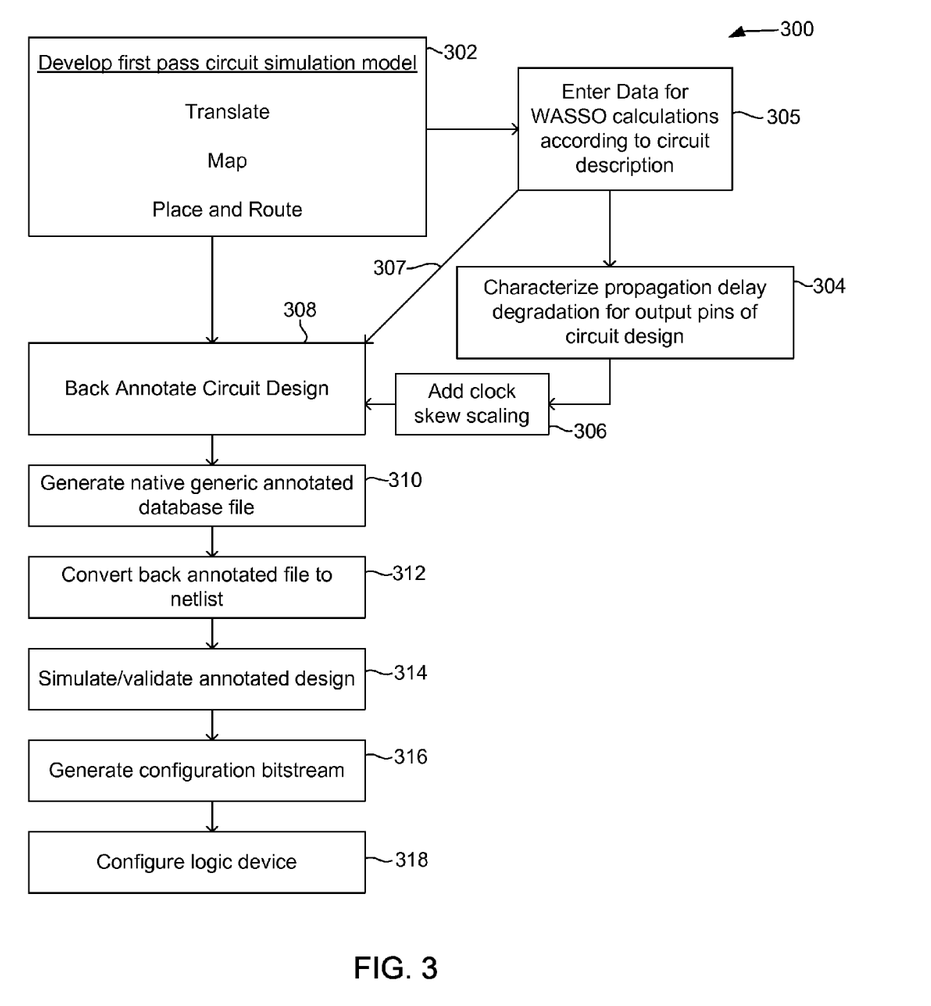
FIG. 3 is a flow chart of a method of simulating operation of a digital system according to an embodiment.

FIG. 3 is a flow chart of a method 300 of simulating performance of an IC according to an embodiment. A circuit simulation model for a programmable (configurable) logic device, such as an FPGA, is developed (step 302).

In an exemplary process, a translate process merges input netlists and design constraints according to the circuit design (application) and outputs a file (e.g., a Xilinx Native Generic Database (NGD) file), that describes the logical design in terms of physical resources on the IC. A mapping process fits the design into the available resources on the target device, such as CLBs and IOBs, and outputs a native circuit description (NCD) file that physically represents the design mapped to components of the logic device. A step commonly known as place and route (PAR) takes the NCD file and places and routes the mapped design according to the timing constraints of the application. The MAP or PAR processes optionally create a native guided mapping (NGM) file that directs or constrains selected resources or routing.

Time delay creep is characterized for an output port of an IC die into a load (step 304). In a particular embodiment, the time delay for a single switched output is characterized into the load, which may be modeled with circuit elements, such as resistances and capacitances, or measured. For N loads, the time delay for a single switched output is multiplied by N, which may be incorporated into a circuit simulation as a look-up table or as a command string. In a particular embodiment, time delay for multiple outputs is developed using data collected for SSO performance of output blocks, as parameters such as number of devices driven, maximum load capacitance per device, total load capacitance per switched group, and calculated average capacitance per load, as well as the number of drivers used per bank and WASSO utilization are typically entered into the WASSO spreadsheet in the ISE Design Suite.

In a further embodiment, for N SSOs (where N is an integer), a scaling factor for clock skew is added (step 306). This scaling factor is not typically included in a product datasheet because of the dependence of a design's behavior on the attributes of the design itself, as well as the IC package and loading in the circuit application. In an exemplary application, it is characterized according to the circuit design and loaded into a data file accessible by the ISE software. Alternatively, one or more nominal scaling factors are included with the product datasheet representing typical load environments. For example, if all N SSOs occur on the same clock edge, they will interact to a greater extent than if some of the SSOs occur at a slightly different time. Generally, switching events that are closer in time affect each other to a greater degree. "Simultaneous" generally refers to SSOs that occur on the same clock cycle; however, an IC or IC system (e.g., stacked IC die or multiple die interconnected with an interposer) may have multiple clock domains or skew within a clock domain that reduces the interaction between switching events.

The SSO-weighted time delay and optional clock skew scaling factor(s), are back annotated into the native generic design (step 308). Back annotation generally is a process that distributes timing information associated with placement, routing, and block configuration from the physical native circuit description design file onto the logical design represented in the native guided mapping file (if provided) to produce a native generic annotated database file (NGDAnno file).

If timing delays cannot be back-annotated to the logical model, the back annotation process may insert a physical model in place of the logical model or a portion of the model. For example, an LUT might be substituted for a group of AND gates. In some cases, if changes are made to the logic of a native circuit description design in the IC editor that change the functional behavior of the design, the back annotation process might not be able to correlate the changed objects in the physical design with the object in the prior logical design. In such cases, the back annotation process recreates the native generic annotated design from a revised native circuit description file.

Back annotation is done from the output pins of the circuit design and a propagation time delay is added to the back annotation generic description. Thus, the back annotation process for a particular digital system design includes a time value for propagation delay according to one or more parameters including the number of outputs switched, the expected load(s), and the number of power/ground pairs in an I/O bank (generally, the compliance of the I/O bank). In some cases, the user adds a time delay representing when all SSOs are assumed to be a logical one (high voltage value), which in a particular embodiment produces a worst-case model. In other cases, a portion of the SSOs are assumed to be logical ones, and the remainder are assumed to be logical zeros.

The NGDAnno process outputs a native generic annotated (NGA) file that is an annotated logical design (step 310). The NGA file is input to a netlist writer (step 312), which converts the back-annotated file into a netlist format for simulation (step 314). If the simulation is valid, a programming generator produces a bitstream for device configuration (step 316), and a configurable logic device, such as an FPGA or hybrid IC with one or more FPGAs, is configured according to the bitstream (step 318). Adding time delay creep modeling to the simulation model and eventual configuration of the IC produces a digital system that operates in a more predictable fashion than if time delay creep is not accounted for in the simulation.

Figure 4:
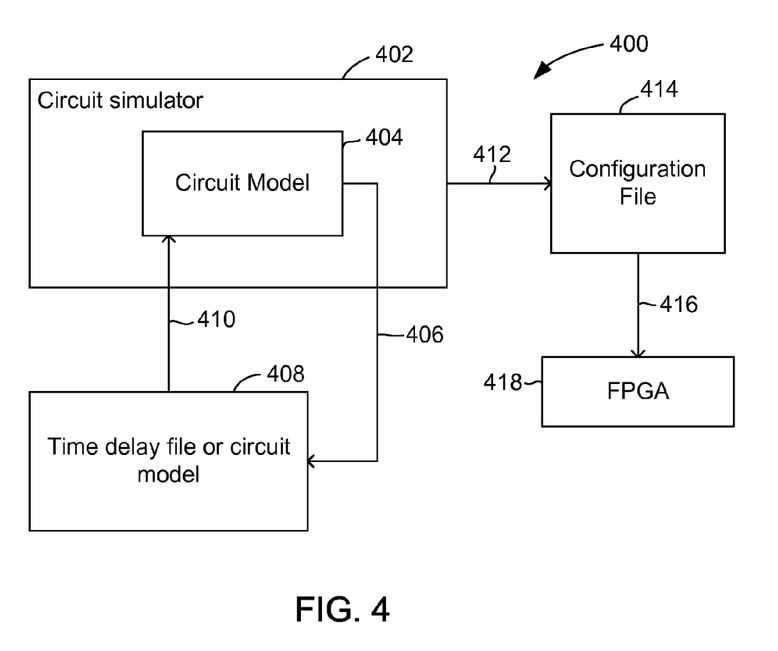
FIG. 4 is a diagram of a system for configuring a programmable logic device according to an embodiment.

FIG. 4 is a diagram of a system 400 for configuring a programmable logic device according to an embodiment. A circuit simulator 402 runs a circuit model 404, which is a computer-readable representation of physical circuit. In a particular embodiment, the circuit simulator is a general-purpose computer configured to operate as a circuit simulator. In an alternative embodiment, the circuit simulator is a dedicated digital processing machine. The circuit model typically is derived using translating, mapping, and place and routing techniques, generally described above in reference to FIG. 3. When the circuit simulator 402 runs the circuit model 404, the circuit simulator provides outputs to a user (not shown), such as voltage levels at nodes and ports and timing information. The circuit simulator provides a circuit description, including SSO information 406 that is provided to a time delay file, table, or model 408 to determine the correct time delay 410 to be added to the circuit model 404. In a typical embodiment, SSO information from many ports of the modeled circuit are provided to the time delay file and a corresponding number of time delays are back-annotated into the circuit model 404.

The circuit model 404 incorporates (i.e., back annotates) the time delay(s) 410 into the circuit model by adding an unused resource, such as flip-flops, LUTs, or programmable delay lines, to one or more signal paths in the circuit model. In some instances, the back-annotated circuit model reallocates resources from the prior model to provide the desired path delays in the current model.

The circuit simulator 402 performs other functions, such as converting the annotated database file to a netlist, and simulating the circuit design to validate operation of the circuit. The inclusion of the time delay(s) 410 provide a more accurate simulation of the eventual physical circuit (e.g., configured FPGA), and hence a more meaningful validation result.

When the user is satisfied that the circuit design is valid, the circuit simulator 402 generates a bitstream such as non-transitory configuration bitstream 412 that is stored in a configuration file 414 on a computer-readable physical medium, such as a magnetic disk, an optical disk, or a flash memory. The configuration bitstream 412 is used to configure a configurable logic device 418, such as an FPGA. Typically several FPGAs are physically configured according to the bitstream. The configured FPGAs perform specific operations according to the circuit definition.

Figure 5:
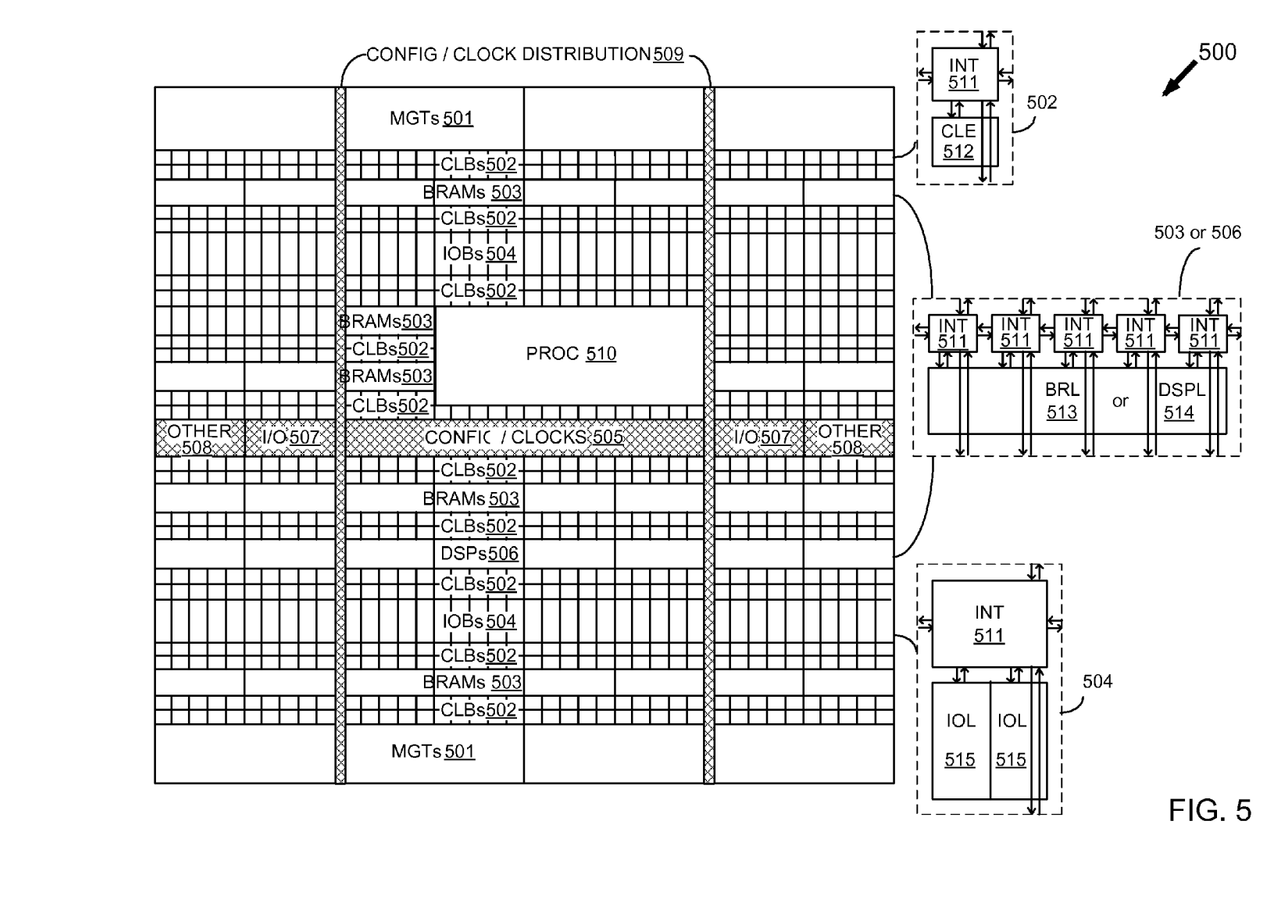
FIG. 5 is a plan view of an FPGA suitable for use with embodiments

FIG. 5 is a plan view of an FPGA 500 suitable for use with embodiments. The FPGA 500 is used in a digital system and interfaces with other digital logic devices. In some embodiments, the FPGA 500 interfaces with one or more other FPGAs, which can be mounted on the same or different packaging substrates or printed wiring boards, or one FPGA might be stacked on another FPGA and operated as a single hybrid device (i.e., the stacked FPGAs are simulated and configured together, with time delay creep corrections being included in the multi-chip configuration bitstream), or multiple FPGA chips are integrated on an interposer, which interconnects the chips to operate as a single hybrid device. The FPGA is fabricated using a CMOS fabrication process or mixed CMOS/NMOS process.

In a particular embodiment, a flip-flop 555 receives a clock signal from an on-chip clock distribution network. The flip-flop 555 is shown near an I/O block 504, as flip-flops in or near I/O blocks are often more susceptible to ground bounce, and hence time delay creep, than flip-flops in other types of functional blocks. Data arriving at the flip-flop 555 may be delayed, relative to the clock signal, such as by routing the signal through another flip-flop (not individually shown for purposes of clarity) in the CLB 502, or other logic resource, such as an LUT. If the data is not present at the flip-flop at the appropriate time, an error may occur. The IC 500 is configured so that data arrives at the flip-flop 555 at a timing point that includes a component for time delay creep according to an embodiment. In one embodiment, the clock signal to the flip-flop 555 is delayed to account for time creep. In an alternative embodiment, the I/O signal to the flip-flop 555 is de-skewed to reduce time creep. In a further embodiment, both the I/O signal and the clock signal are adjusted to account for time creep.

The FPGA architecture includes a large number of different programmable tiles including multi-gigabit transceivers (MGTs) 501, configurable logic blocks (CLBs) 502, random access memory blocks (BRAMs) 503, input/output blocks (IOBs) 504, configuration and clocking logic (CONFIG/CLOCKS) 505, digital signal processing (DSP) blocks 506, specialized input/output blocks (I/O) 507 (e.g., configuration ports and clock ports), and other programmable logic 508 such as digital clock managers, analog-to-digital converters, system monitoring logic, and so forth. Some FPGAs also include dedicated processor blocks (PROC) 510. Horizontal areas 509 extending from the CONFIG/CLOCKS 505 column are used to distribute the clocks and configuration signals across the breadth of the FPGA 500.

In some FPGAs, each programmable tile includes a programmable interconnect element (INT) 511 having standardized connections to and from a corresponding interconnect element in each adjacent tile. Therefore, the programmable interconnect elements taken together implement the programmable interconnect structure for the illustrated FPGA. The programmable interconnect element (INT) 511 also includes the connections to and from the programmable logic element within the same tile, as shown by the examples included at the top of FIG. 5.

For example, a CLB 502 can include a configurable logic element (CLE 512) that can be programmed to implement user logic plus a single programmable interconnect element (INT) 511. A BRAM 503 can include a BRAM logic element (BRL) 513 in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 506 can include a DSP logic element (DSPL) 514 in addition to an appropriate number of programmable interconnect elements. An IOB 504 can include, for example, two instances of an input/output logic element (IOL) 515 in addition to one instance of the programmable interconnect element (INT) 511. Some FPGAs utilizing the architecture illustrated in FIG. 5 include additional logic blocks that disrupt the regular columnar structure making up a large part of the FPGA. The additional logic blocks can be programmable blocks and/or dedicated logic. For example, the processor block PROC 510 shown in FIG. 5 spans several columns of CLBs and BRAMs. PROC 510 may comprise a single power domain or it may comprise multiple power domains or it may share a power domain with other blocks in FPGA 500.

Note that FIG. 5 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 5 are purely exemplary. For example, in an actual FPGA more than one adjacent column of CLBs is typically included wherever the CLBs appear, to facilitate the efficient implementation of user logic.

While the present invention has been described in connection with specific embodiments, variations of these embodiments will be obvious to those of ordinary skill in the art. For example, alternative arrangements of dielectric TSVs, or different types of substrates or substrate material could be used, or processing steps could be performed in a different order. Therefore, the spirit and scope of the appended claims should not be limited to the foregoing description.

What is claimed is:

1. A method of configuring an integrated circuit comprising:
    developing a circuit simulation model of a circuit having an output port to be configured in the integrated circuit;
    defining a number of simultaneously switched outputs (SSOs) according to the circuit simulation model;
    characterizing a propagation delay at the output port according to the number of SSOs;
    back-annotating the circuit simulation model from the output port to add the propagation delay in a signal path of the output port to produce a second circuit simulation model;
    on a programmed computer, generating a bitstream according to the second circuit simulation model; and
    configuring the integrated circuit according to the bitstream.

2. The method of claim 1 wherein the integrated circuit is a programmable logic device.

3. The method of claim 1 wherein the characterizing the propagation delay includes measuring a propagation delay of a single switched output and multiplying the propagation delay by the number of simultaneously switched outputs.

4. The method of claim 1 wherein the characterizing the propagation delay includes measuring a plurality of propagation delays for a corresponding plurality of numbers of SSOs.

5. The method of claim 1 wherein back-annotating the circuit simulation model includes adding the propagation delay to a weighted-average SSO timing value of the circuit simulation model.

6. The method of claim 1 wherein the circuit simulation model includes a package load model connected to the output port.

7. The method of claim 1 wherein the circuit simulation model includes a printed wiring board load model connected to the output port.

8. The method of claim 1 wherein the signal path is a clock signal path.

9. A system for configuring an integrated circuit comprising:
    a processor; and
    a memory coupled to the processor, wherein the memory is configured with instructions that when executed by the processor cause the processor to perform operations of:
        developing a circuit simulation model of a circuit having an output port to be configured in the integrated circuit;
        defining a number of simultaneously switched outputs (SSOs) according to the circuit simulation model;

characterizing a propagation delay at the output port according to the number of SSOs;

back-annotating the circuit simulation model from the output port to add the propagation delay in a signal path of the output port to produce a second circuit simulation model;

generating a bitstream according to the second circuit simulation model; and configuring the integrated circuit according to the bitstream.

10. The system of claim 9, wherein the integrated circuit is a programmable logic device.

11. The system of claim 9, wherein the characterizing the propagation delay includes measuring a propagation delay of a single switched output and multiplying the propagation delay by the number of simultaneously switched outputs.

12. The system of claim 9, wherein the characterizing the propagation delay includes measuring a plurality of propagation delays for a corresponding plurality of numbers of SSOs.

13. The system of claim 9, wherein back-annotating the circuit simulation model includes adding the propagation delay to a weighted-average SSO timing value of the circuit simulation model.

14. The system of claim 9, wherein the circuit simulation model includes a package load model connected to the output port.

15. The system of claim 9, wherein the circuit simulation model includes a printed wiring board load model connected to the output port.

16. The system of claim 9, wherein the signal path is a clock signal path.

17. A computer program product for configuring an integrated circuit, the computer program product comprising:

a non-transitory computer readable storage medium having computer readable program code embodied therewith, the computer readable program code including a circuit simulation model of a circuit having an output port to be configured in the integrated circuit and instructions for:

defining a number of simultaneously switched outputs (SSOs) according to the circuit simulation model;

characterizing a propagation delay at the output port according to the number of SSOs;

back-annotating the circuit simulation model from the output port to add the propagation delay in a signal path of the output port to produce a second circuit simulation model; and generating a bitstream according to the second circuit simulation model for configuring the integrated circuit.

\* \* \* \* \*